3,661,952
ORGANOLEAD MANUFACTURE
Wilford H. Thomas, Paul Kobetz, and Albert P. Giraitis, Baton Rouge, La., assignors to Ethyl Corporation, New York, N.Y.
No Drawing. Filed July 29, 1970, Ser. No. 59,359
Int. Cl. C07f 7/24
U.S. Cl. 260—437 R                    23 Claims

ABSTRACT OF THE DISCLOSURE

The process for the production of tetraalkyllead compounds from sodium-lead alloy and an alkyl halide is improved by the utilization of a hydrocarbyl-aluminum catalyst and a promoter or adjuvant selected from the group consisting of an alkali metal fluoride, an alkaline earth metal fluoride, an alkaline metal cyanide, an alkaline earth metal cyanide, an alkali metal alkoxide, an alkaline earth metal alkoxide and any mixture thereof. The hydrocarbyl-aluminum catalyst may be either a lower or alkyl aluminum halide or a lower alkyl aluminum alkoxide.

BACKGROUND OF THE INVENTION

It has long been known that tetraalkyllead compounds can be made generally by the reaction of an alkali metal lead alloy and an alkyl halide. The use of aluminum-containing compounds as catalytic agents for this type of reaction has also long been known by those skilled in the art. See U.S. 1,962,173; U.S. 2,270,109; U.S. 3,048,610; U.S. 3,478,072; U.S. 3,188,332; and U.S. 3,226,409. The foregoing improved processes using the aluminum-containing catalyst have been quite successful, but even with the improvement therein obtained over the basic alkali metal lead alloy-alkyl halide route to tetraalkylleads, there is considerable room for additional improvement, particularly in the area of product yield per unit of reaction time. Therefore, it is an object of the present invention to provide a new and improved process for the manufacture of tetraalkyllead compounds. It is a further object to provide a novel catalyzed process for the synthesis of tetraalkyllead compounds whereby excellent yields are obtained. In particular, it is an object of this invention to provide an improved process for the production of tetramethyllead.

THE INVENTION

The process of the present invention comprises reacting an alkyl halide and a sodium-lead alloy in the presence of a catalyzed system which contains a hydrocarbyl-aluminum catalyst and a catalyst promoter or adjuvant selected from the group consisting of an alkali metal fluoride, an alkaline earth metal fluoride, an alkali metal cyanide, an alkaline earth metal cyanide, an alkali metal alkoxide, an alkaline earth metal alkoxide, and any mixture thereof, to produce tetralkyllead compounds. The hydrocarbyl-aluminum catalysts are either a lower alkyl aluminum halide, a lower alkyl aluminum alkoxide or a mixture thereof.

Among the advantageous features of this invention is that the time required for reacting a given quantity of the reactants in the system of this invention may be significantly reduced over the time required previously in systems found in the prior art. A further advantage resides in the fact that alkyllead compounds, especially tetramethyllead, may be produced in higher over-all yields than achieved in the prior art on a commercial basis. As can be readily realized the combined effect of these advantages is to render the present process more efficient and productive. Furthermore, these advantages may be obtained on an economical basis as many of the catalysts and promoters used in accordance with this invention are commercially available at relatively low cost.

The hydrocarbyl-aluminum compounds to be employed as catalysts in this invention are either a lower alkyl aluminum halide or a lower alkyl aluminum alkoxide, or any mixture thereof. Other elements of the Group III-A family may be substituted for the aluminum in these catalysts, although such substitution would not be preferred due to the economic disadvantage of such substitution.

The lower alkyl aluminum halides used in the process are preferably those in which the alkyl groups each contain no more than about six carbon atoms. Of these compounds the lower alkyl aluminum chlorides and the lower alkyl aluminum bromides are preferred as they are the most generally available and economical of all of the lower alkyl aluminum halides. From the standpoint of cost effectiveness, methyl aluminum sesquichloride and ethyl aluminum sesquichloride are the most highly preferred. Exemplary of other lower alkyl aluminum halides which are suitable for this process are ethyl aluminum sesquibromide, methyl aluminum sesquibromide, methyl aluminum dichloride, ethyl aluminum dibromide, dimethyl aluminum bromide, diethyl aluminum chloride, methyl aluminum sesquifluoride, dimethyl aluminum iodide, ethyl aluminum difluoride, methyl aluminum sesquiiodide, dibutyl aluminum chloride and dihexyl aluminum chloride.

The lower alkyl aluminum alkoxide catalysts are those having an alkyl radical with no more than about six carbon atoms and having an alkoxide radical from one to about 20 carbon atoms. For example, dimethyl aluminum ethoxide, dimethyl aluminum methoxide, dimethyl aluminum hexoxide, ethyl aluminum diethoxide, propyl aluminum dibutoxide, dihexyl aluminum heptoxide, dimethyl aluminum octadecoxide, dibutyl aluminum butoxide, methyl aluminum sesquiethoxide and the like. The most preferred of the alkoxide catalysts are those having alkyl radicals with less than three carbon atoms and having an alkoxide radical with less than six carbon atoms.

The hydrocarbyl-aluminum catalyst is usually supplied to the reaction zone of this invention in an already prepared state. However, in some cases, in situ production of the catalyst is often preferred. To illustrate, in situ production of the alkyl aluminum halide catalyst may be accomplished by adding aluminum metal or aluminum trihalide, or both, to the reaction mixture. For example, methyl aluminum sesquichloride can be produced in situ by the reaction of aluminum trichloride and tetramethyllead in the presence of methyl chloride (see U.S. 3,048,-610), the methyl chloride being present as a reactant for producing tetramethyllead. The tetramethyllead for this in situ catalyst formation may be added or may be part of the residue left in the reaction zone from prior tetramethyllead-producing reactions.

As before said, the promoter for the hydrocarbyl-aluminum catalyst is an alkali metal fluoride, an alkaline earth metal fluoride, an alkali metal cyanide, an alkaline earth metal cyanide, an alkali metal alkoxide, an alkaline earth metal alkoxide, or any combination of any or all of these. It is to be understood that the term alkaline earth metal is taken in its most widely used sense to encompass the elements Mg, Ca, Sr and Ba, and likewise the alkali metals are Li, Na, KRb and Cs. [See International Encyclopedia of Chemical Science, D. Van Nostrand Company, Inc. (1964).] The promoter can be represented by the formula $MX_n$, wherein M is an alkali metal or an alkaline earth metal; X is a fluoride, cyanide or alkoxide radical in which there are up to about 20 carbon atoms and preferably up to about six carbon atoms; and $n$ is 1 or 2 depending on the valence of M. Illustrative examples of such promoters are sodium fluoride, potassium fluoride, rubidium fluoride, lithium fluoride, potassium cyanide, sodium cyanide, lithium cyanide, cesium cyanide, calcium fluoride, magnesium fluoride, strontium cyanide, barium cyanide, sodium propoxide, potassium ethoxide, calcium ethoxide, magnesium hexoxide, and the like.

From the standpoint of economics and ease of handling, the preferred promoters are those in which the anion is the fluoride radical. Likewise, considering the cationic or metallic portion of the promoter, the alkali metals, sodium and potassium, and the alkaline earth metals, calcium and magnesium, are preferred. Consequently, the most preferred promoters are sodium fluoride, calcium fluoride, magnesium fluoride and potassium fluoride. For tetramethyllead production, calcium fluoride and sodium fluoride have been found especially effective as promoters, especially if utilized in conjunction with methyl aluminum sesquichloride.

When using the catalyst-catalyst promoter system of this invention there is no requirement to maintain the same anionic identity between the catalyst and the promoter. For example, the catalyst can have an alkoxide anion and can still be effectively used with a promoter having a fluoride anion. Therefore, any one of the above-described catalysts and any one of the above-described promoters can be used together to practice this invention.

The exact manner in which the catalyst and the catalyst promoter operate so as to effect the improved yields and reaction rates of this invention is not known. However, it is suspected that the catalytic factor may be, or at least may involve, a complex formed between the two compounds. In any event it is possible to add directly to the reaction system a preformed complex made from the above-described catalysts and catalyst promoters and thereby derive the benefits of this invention.

Quantitatively, in practicing the process of this invention there should be about 0.05 to about 2.0 gram moles—and preferably from about 0.067 to about 1.00 gram moles—of the promoter per gram atom of aluminum contained in the hydrocarbyl-aluminum catalyst. Preferably, the hydrocarbyl-aluminum catalyst will be utilized in an amount equivalent to from about 0.15 to about 0.25 percent by weight of aluminum based on the weight of sodium-lead alloy initially present in the reaction system or zone, although deviations from these proportions are feasible. The precise weight of the hydrocarbyl-aluminum catalyst introduced into the reaction zone will of course depend upon the molecular weight of the particular catalyst used and the quantity of the lead alloy charge.

Several different modes of introducing the catalysts to the reaction zone are available for use. A preferred mode of addition involves providing all of the hydrocarbyl-aluminum catalyst and the adjuvant at the beginning of the reaction period, although it is entirely feasible to introduce these materials on an incremental basis (either continuously or periodically) during the course of the reaction. The promoter and the hydrocarbyl-aluminum catalyst may be fed separately in either order or simultaneously or they may be fed after they have been premixed. Irrespective of the mode of addition, it is desirable to supply the catalyst and promoter at the start or during the first 15 minutes of the reaction period.

Various alkyl halides can be used as reactants in this invention although the most widely used alkyl halides for this type of reaction are the ethyl halides and the methyl halides as they provide the lead alkyls in current commercial use. Of course, any combination of the halides may also be used. Methyl chloride, ethyl chloride or a combination of the two are the preferred halide reactants for making the commercial antiknock agents.

This invention, in its most preferred form, is most advantageous in producing tetramethyllead. In such production it has been found that the catalyst-promoter combination of methyl aluminum sesquichloride and sodium fluoride or calcium fluoride or a mixture of both is preferred. Of course, in producing tetramethyllead, the alkyl halide reactant is a methyl halide, preferably methyl chloride. It should be noted that in this preferred embodiment the hydrocarbyl-aluminum catalyst, methyl aluminum sesquichloride, can be added to the reaction mixture in any one of the prior mentioned modes or may be produced in situ as previously mentioned, i.e., by the addition of aluminum metal or aluminum trihalide, or both, to the reaction mixture.

Various operating procedures are permissible for carrying out any particular embodiment of this invention. In general, batch or cyclic techniques are preferred. According to such techniques, a reaction zone is charged with subdivided solid sodium-lead alloy, usually the mono-sodium lead alloy, and the $MX_n$ promoter. The autoclave is then heated to about 65° C. Subsequent to the heating, the hydrocarbyl-aluminum catalyst and an inert hydrocarbon are introduced to the system. Usually, a tetraalkyllead compound also accompanies the hydrocarbyl-aluminum-inert hydrocarbon charge as it has been found to suppress undesirable side reactions between the inert hydrocarbon and the alkyl halide reactant. Of course, the tetraalkyllead compound need not be introduced if it is already present in the autoclave from previous reactions. The inert hydrocarbon is generally present in a quantity generally in the proportions of about 2.5 to about 7.0 weight percent of the lead in the alloy. The addition of an inert hydrocarbon into the reaction mixture is highly beneficial in that enhanced yield and increased thermal stability of the product are realized. See in this connection the disclosures of U.S. 3,049,558 and 3,515,739. The inert hydrocarbons that can be used are paraffins, olefins, cycloparaffins or aromatic hydrocarbons having a boiling point within the range of from about 90 to about 140° C. Preferably, the inert hydrocarbon is commercial toluene as it is very cheap, easily obtained, very effective as a thermal stabilizer for tetramethyllead, and has a boiling point very close to that of tetramethyllead so that it will remain with it during subsequent processing operations to insure an adequate margin of safety against thermal hazards that might possibly be encountered. After the above-described charged has been made, the reactor is sealed except for necessary venting connections, the temperature is raised to the temperature range of about 80° C. to about 100° C. while the system is agitated and the alkyl halide is fed. The alkyl halide, in some cases, is charged all at one time, and in other cases it is fed in over a deliberate finite period. The total alkyl halide is provided in proportions of at least one stoichiometric requirement or theory, and usually, a substantial excess is used. It will be understood that this refers to the total quantity fed during batch operations. During portions of such cyclic operations, only minor quantities of the alkyl halide may be present when the feed is "spread out" over a finite period. The materials thus charged together are then reacted at temperatures ranging from about 80 to about 120° C. Also present in the reaction mixture will be an alkali metal halide, such as sodium chloride, as a reaction product from previous tetraalkyllead reactions. This is usually the case in commercial operations due to the difficulty of purging the autoclave essentially clean of all prior reactants and reaction products. Further, the alkali metal halide will of course always be present during the reaction as a natural product thereof. It has been found that when using the alkali metal containing promoter a temperature of about 80° C. is satisfactory for starting the alkyl halide feed. A higher temperature of about 90° C., is preferred when using an alkaline earth meal containing promoter. Agitation is provided throughout the reaction period as the reaction system includes solids and volatile liquids. The reaction is continued to completion, requiring from about 45 minutes to less than 75 minutes dependent upon the configuration of the apparatus, the degree of agitation, the temperature, and the quantity of alloy to be reacted. Agitation of the reaction mixture becomes more difficult as the reaction proceeds due to a thickening of the mixture. This problem is alleviated by the addition of a reaction lubricant to the reaction mixture. A highly beneficial lubricant is graphite.

EXAMPLES VII–XV

The procedure of Example I is repeated utilizing the catalysts and catalyst promoters set forth in Table II.

TABLE I

| Example | Quantity of $(CH_3)_3Al_2Cl_3$ catalyst, g. | Promoter Compound | Wt. (g.) | Quantity of methyl chloride fed, g. | Methyl chloride feed temp, °C. | Reaction time (min.) | Yield of tetramethyllead produced Wt. (g.) | Percentage |
|---|---|---|---|---|---|---|---|---|
| II | 3.50 | NaF | 0.60 | 263 | 80 | 56 | 129.0 | 88.9 |
| III | 3.48 | NaF | 0.25 | 241 | 80 | 63 | 122.4 | 84.4 |
| IV | 3.48 | $CaF_2$ | 0.40 | 263 | 90 | 63 | 120.9 | 83.4 |
| V | 3.48 | | | 252 | 80 | 75 | 115.6 | 79.7 |
| VI | 3.48 | | | 241 | 80 | 63 | 115.2 | 79.4 |

TABLE II

| Example | Hydrocarbyl-aluminum catalyst Compound | Wt. (g.) | Promoter Compound | Wt. (g.) | Alkyl halide Compound | Wt. (g.) |
|---|---|---|---|---|---|---|
| VII | $(CH_3)_3Al_2Cl_3$ | 3.40 | KF | 0.55 | $CH_3Cl$ | 274 |
| VIII | $(CH_3)_3Al_2Cl_3$ | 3.90 | CsCN | 1.52 | $C_2H_5Cl$ | 337 |
| IX | $(CH_3)_3Al_2(OCH_3)_3$ | 3.26 | NaCN | 0.29 | $CH_3Cl$ | 263 |
| X | $(C_6H_{13})_3Al_2(OCH_3)_3$ | 6.62 | $MgF_2$ | 0.19 | $CH_3Cl$ | 263 |
| XI | $(CH_3)_3Al_2(OC_6H_{13})_3$ | 6.70 | $CaF_2$ | 0.40 | $CH_3Cl$ and $(C_2H_5)Cl$ | 143, 168 |
| XII | $(CH_3)_3Al_2Cl_3$ | 3.48 | $BaF_2$ | 0.52 | $CH_3Cl$ | 263 |
| XIII | $(C_2H_5)_2AlCl$ | 4.08 | $NaOC_4H_9$ | 0.57 | $C_2H_5Cl$ | 310 |
| XIV | $(C_2H_5)_2AlBr$ | 5.6 | NaF | 0.25 | $CH_3Br$ | 455 |
| XV | $(CH_3)_2AlI$ | 6.46 | $Ca(OC_2H_5)_2$ | 0.39 | $CH_3I$ | 680 |

On completion of the reaction, the autoclave and contents are cooled and discharged, and the tetralkyllead compound is recovered from the lead and alkali metal halide components of the reaction mass. When small portions of inert-hydrocarbon additive are employed in the synthesis reaction the tetraalkyllead compound is usually accompanied on recovery by said hydrocarbon liquid.

The present invention results in the attainment of high ultimate yields which are frequently higher than normally encountered.

The following non-limiting examples will further illustrate the practice and benefits obtained from using the present invention.

EXAMPLE I

An autoclave was charged with 500 grams of comminuted mono-sodium lead alloy, containing 10 weight percent sodium, and 0.25 gram sodium fluoride. A mixture of 3.48 grams of methyl aluminum sesquichloride and 3.76 grams of tetramethyllead was dissolved in 26.95 grams of anhydrous toluene and then subsequently charged into the agitating autoclave.

The charge thus established was then sealed in the autoclave and heated to about 80° C. Methyl chloride was then fed to the autoclave interior at a rate of 25–30 grams per minute until 263 grams had been fed to the autoclave. The pressure was maintained at about 250 p.s.i.g. and the temperature was allowed to increase to about 120° C.

Upon completion of the reaction, after a period of approximately 56 minutes, the contents of the autoclave were cooled and removed from the interior. The amount of tetramethyllead produced was determined by its extraction from the reaction mass, with a hydrocarbon solvent, and by titration of the tetramethyllead by an iodine analysis of the aliquot of the liquid extract. It was thus established that 122.4 grams of tetramethyllead had been produced which was equivalent to a tetramethyllead yield of 84.4 percent.

EXAMPLES II–VI

The procedure of Example I was repeated in a group of runs with and without catalyst promoters. Table I delineates the variations and corresponding results for these runs. Examples V and VI were comparative runs in which no promoter was employed.

What is claimed is:

1. In a process for the preparation of tetraalkyllead by reacting a sodium-lead alloy with an alkyl halide in the presence of a catalytic quantity of a hydrocarbyl-aluminum catalyst, the improvement according to which:
   (1) the hydrocarbyl-aluminum catalyst is selected from the group consisting of lower alkyl aluminum halides, lower alkyl aluminum alkoxides, and any mixture thereof;
   (2) the system additionally contains a catalyst promoter selected from the group consisting of an alkali metal fluoride, an alkaline earth metal fluoride, an alkali metal cyanide, an alkaline earth metal cyanide, an alkali metal alkoxide containing no more than about 20 carbon atoms, an alkaline earth metal alkoxide containing no more than about 20 carbon atoms, and any mixture thereof; and
there being from about 0.05 to about 2.0 gram moles of the promoter per gram atom of aluminum contained in the hydrocarbyl-aluminum catalyst.

2. The process of claim 1 wherein the alkyl halide is ethyl chloride.

3. In a process for the preparation of tetraalkyllead by reacting, in the presence of a catalytic quantity of a hydrocarbyl-aluminum catalyst, a sodium-lead alloy with a methyl halide, or with a methyl halide and an ethyl halide, the improvement according to which:
   (1) the hydrocarbyl-aluminum catalyst is selected from the group consisting of lower alkyl aluminum halides, lower alkyl aluminum alkoxides, and any mixture thereof;
   (2) the system additionally contains a catalyst promoter selected from the group consisting of an alkali metal fluoride, an alkaline earth metal fluoride, an alkali metal cyanide, an alkaline earth metal cyanide, an alkali metal alkoxide containing no more than about 20 carbon atoms, an alkaline earth metal alkoxide containing no more than about 20 carbon atoms, and any mixture thereof; and
there being from about 0.05 to about 2.0 gram moles of the promoter per gram atom of aluminum contained in the hydrocarbyl-aluminum catalyst.

4. The process of claim 3 wherein an alkali metal-containing promoter is used and the alkali metal thereof is sodium or potassium.

5. The process of claim 3 wherein an alkaline earth metal-containing promoter is used and the alkaline earth metal thereof is calcium or magnesium.

6. The process of claim 3 wherein the promoter is sodium fluoride.

7. The process of claim 3 wherein the promoter is calcium fluoride.

8. The process of claim 3 wherein the hydrocarbyl-aluminum catalyst is a lower alkyl aluminum chloride or a lower alkyl aluminum bromide.

9. In a process for the preparation of tetramethyllead by reacting, in the presence of a catalytic quantity of a hydrocarbyl-aluminum catalyst, a sodium-lead alloy with methyl halide, the improvement according to which:
(1) the hydrocarbyl-aluminum catalyst is selected from the group consisting of lower alkyl aluminum halides, lower alkyl aluminum alkoxides, and any mixture thereof;
(2) the system additionally contains a catalyst promoter selected from the group consisting of an alkali metal fluoride, an alkaline earth metal fluoride, an alkali metal cyanide, an alkaline earth metal cyanide, an alkali metal alkoxide containing no more than about 20 carbon atoms, an alkaline earth metal alkoxide containing no more than about 20 carbon atoms, and any mixture thereof; and
there being from about 0.05 to about 2.0 gram moles of the promoter per gram atom of aluminum contained in the hydrocarbyl-aluminum catalyst.

10. The process of claim 9 wherein the catalyst is a lower alkyl aluminum halide produced in situ by the addition of aluminum metal or aluminum trihalide, or both, to the reaction mixture.

11. The process of claim 9 wherein the hydrocarbyl-aluminum catalyst is methyl aluminum sesquichloride.

12. The process of claim 9 wherein the hydrocarbyl-aluminum catalyst utilized is methyl aluminum sesquichloride and the promoter used is sodium fluoride.

13. The process of claim 9 wherein the hydrocarbyl-aluminum catalyst utilized is methyl aluminum sesquichloride and the promoter used is calcium fluoride.

14. The process of claim 9 wherein the hydrocarbyl-aluminum catalyst is methyl aluminum sesquichloride and the promoter is sodium fluoride, the methyl aluminum sesquichloride being formed in situ by the addition of aluminum or aluminum trichloride, or a combination of the two, to the reaction mixture.

15. The process of claim 9 wherein the hydrocarbyl-aluminum catalyst is methyl aluminum sesquichloride and the promoter is calcium fluoride, the methyl aluminum sesquichloride being formed in situ by the addition of aluminum or aluminum trichloride, or a combination of the two, to the reaction mixture.

16. The process of claim 9 wherein there are from about 0.067 to about 1.00 gram moles of the promoter per gram atom of aluminum in the hydrocarbyl-aluminum catalyst and wherein said catalyst is utilized in an amount equivalent to from about 0.15 to about 0.25 percent by weight of aluminum content, based on the weight of the sodium-lead alloy initially present in the reaction system.

17. The process of claim 9 wherein the promoter is sodium fluoride present in an amount of from about 0.067 to about 1.00 gram moles per gram atom of aluminum in the hydrocarbyl-aluminum catalyst and wherein said catalyst is utilized in an amount equivalent to from about 0.15 to about 0.25 percent by weight of aluminum content, based on the weight of the sodium-lead alloy initially present in the reaction system.

18. The process of claim 9 wherein the promoter is calcium fluoride present in an amount of from about 0.067 to about 1.00 gram moles per gram atom of aluminum in the hydrocarbyl-aluminum catalyst and wherein said catalyst is utilized in an amount equivalent to from about 0.15 to about 0.25 percent by weight of aluminum content, based on the weight of the sodium-lead alloy initially present in the reaction system.

19. The process of claim 9 wherein the reaction is performed in an inert liquid hydrocarbon reaction medium.

20. The process of claim 9 wherein there is additionally present in the reaction mixture a liquid paraffin, olefin, cycloparaffin, or aromatic hydrocarbon boiling within the range of from about 90 to about 150° C.

21. The process of claim 9 wherein toluene is additionally present in the reaction mixture.

22. The process of claim 9 wherein the hydrocarbyl-aluminum catalyst is methyl aluminum sesquichloride, wherein the promoter is sodium fluoride, wherein the sodium fluoride promoter is present in an amount of from about 0.067 to about 1.00 gram moles per gram atom of aluminum in the hydrocarbyl-aluminum catalyst, wherein said catalyst is utilized in an amount equivalent to from about 0.15 to about 0.25 percent by weight of aluminum based on the weight of the sodium-lead alloy initially present in the reaction system, and wherein toluene is additionally present in the system.

23. The process of claim 9 wherein the hydrocarbyl-aluminum catalyst is methyl aluminum sesquichloride, wherein the promoter is calcium fluoride, wherein the calcium fluoride promoter is present in an amount of from about 0.067 to about 1.00 gram moles per gram atom of aluminum in the hydrocarbyl-aluminum catalyst, wherein said catalyst is utilized in an amount equivalent to from about 0.15 to about 0.25 percent by weight of aluminum based on the weight of the sodium-lead alloy initially present in the reaction system, and wherein toluene is additionally present in the system.

References Cited
UNITED STATES PATENTS

| | | | |
|---|---|---|---|
| 1,962,173 | 6/1934 | Calcott et al. | 260—437 R |
| 2,270,109 | 1/1942 | Calingaert | 260—437 R |
| 3,048,610 | 8/1962 | Jarvie et al. | 260—437 R |
| 3,072,694 | 1/1963 | Tullio | 260—437 R |
| 3,188,332 | 6/1965 | Kobetz et al. | 260—437 R |
| 3,188,333 | 6/1965 | Beaird et al. | 260—437 R |
| 3,188,334 | 6/1965 | Beaird et al. | 260—437 R |
| 3,192,240 | 6/1965 | Kobetz et al. | 260—437 R |
| 3,226,408 | 12/1965 | Beaird et al. | 260—437 R |
| 3,226,409 | 12/1965 | Beaird et al. | 260—437 R |
| 3,478,072 | 11/1969 | Barton | 260—437 R |

OTHER REFERENCES

Chemical Abstracts, vol. 64, p. 273a (1966), and vol. 70, p. 29061b (1969).

TOBIAS E. LEVOW, Primary Examiner

H. M. S. SNEED, Assistant Examiner

UNITED STATES PATENT OFFICE
CERTIFICATE OF CORRECTION

Patent No. 3,661,952    Dated   May 9, 1972

Inventor(s)   Wilford H. Thomas et al.

It is certified that error appears in the above-identified patent and that said Letters Patent are hereby corrected as shown below:

Column 1, line 20, "either a lower or alkyl" should read -- either a lower alkyl --. Column 4, line 42, "charged" should read -- charge --.

Signed and sealed this 6th day of March 1973.

(SEAL)
Attest:

EDWARD M. FLETCHER, JR.
Attesting Officer

ROBERT GOTTSCHALK
Commissioner of Patents